US012018459B2

(12) United States Patent
Nakajima et al.

(10) Patent No.: US 12,018,459 B2
(45) Date of Patent: Jun. 25, 2024

(54) HYDRAULIC CONTROL SYSTEM FOR A WORKING MACHINE

(71) Applicant: Caterpillar SARL, Geneva (CH)

(72) Inventors: Hideki Nakajima, Akashi (JP); Koichi Kiyasu, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 17/792,446

(22) PCT Filed: Jan. 8, 2021

(86) PCT No.: PCT/EP2021/025003
§ 371 (c)(1),
(2) Date: Jul. 13, 2022

(87) PCT Pub. No.: WO2021/144143
PCT Pub. Date: Jul. 22, 2021

(65) Prior Publication Data

US 2023/0119892 A1 Apr. 20, 2023

(30) Foreign Application Priority Data

Jan. 14, 2020 (JP) ................................ 2020-003371

(51) Int. Cl.
*E02F 9/22* (2006.01)
*E02F 3/42* (2006.01)
(Continued)

(52) U.S. Cl.
CPC ............ *E02F 9/2242* (2013.01); *E02F 3/425* (2013.01); *E02F 9/2004* (2013.01);
(Continued)

(58) Field of Classification Search
CPC ...... F15B 11/166; F15B 11/17; F15B 21/082; F15B 21/087; E02F 9/2239; E02F 9/2242; E02F 9/2285; E02F 9/2292; E02F 9/2296
See application file for complete search history.

(56) References Cited

U.S. PATENT DOCUMENTS 5,101,627 A * 4/1992 Fujii ..................... E02F 9/2292 60/486
7,127,887 B2 * 10/2006 Nakamura ............ F15B 21/087 60/494
(Continued)

FOREIGN PATENT DOCUMENTS

CN 102893037 1/2013
CN 103016456 4/2013
(Continued)

OTHER PUBLICATIONS

Japanese Patent Office Action for Japan Patent Appln. No. 2020-003371, dated May 25, 2023 (8 pgs).
(Continued)

*Primary Examiner* — Michael Leslie

(57) ABSTRACT

To enable to arbitrarily change a hydraulic pump which supplies pressure oil to a hydraulic actuator at first in a hydraulic control system equipped with the hydraulic actuator using both first and second hydraulic pumps as a pressure oil source. An operation means is installed which can arbitrarily change working order of the first flow rate control valves for boom and stick for controlling the supply flow rate from first hydraulic pump to boom cylinder and stick cylinder and second flow rate control valves for boom and stick for controlling the supply flow rate from second hydraulic pump to boom cylinder and stick cylinder.

5 Claims, 8 Drawing Sheets

(51) Int. Cl.

| | |
|---|---|
| ***E02F 9/20*** | (2006.01) |
| ***F15B 11/17*** | (2006.01) |
| ***F15B 13/02*** | (2006.01) |
| ***F15B 21/08*** | (2006.01) |

(52) U.S. Cl.

CPC .......... *E02F 9/2203* (2013.01); *E02F 9/2292* (2013.01); *F15B 11/17* (2013.01); *F15B 13/02* (2013.01); *F15B 21/082* (2013.01); *F15B 21/087* (2013.01); *E02F 9/2285* (2013.01); *E02F 9/2296* (2013.01); *F15B 2211/20546* (2013.01); *F15B 2211/20576* (2013.01); *F15B 2211/426* (2013.01); *F15B 2211/665* (2013.01); *F15B 2211/6652* (2013.01); *F15B 2211/6654* (2013.01); *F15B 2211/6658* (2013.01); *F15B 2211/7135* (2013.01); *F15B 2211/7142* (2013.01)

(56) References Cited

U.S. PATENT DOCUMENTS

| | | | | |
|---|---|---|---|---|
| 9,568,030 | B2 * | 2/2017 | Gorman | E02F 9/2066 |
| 9,816,252 | B2 * | 11/2017 | Hoshino | F02D 29/02 |
| 10,676,897 | B2 * | 6/2020 | Oka | E02F 9/2235 |
| 11,105,348 | B2 * | 8/2021 | Kim | E02F 9/2285 |
| 11,454,004 | B2 * | 9/2022 | Kumagai | E02F 9/2296 |
| 2010/0162696 | A1 | 7/2010 | Kakizawa et al. | |
| 2013/0074486 | A1 | 3/2013 | Mcwethy et al. | |
| 2018/0073525 | A1 * | 3/2018 | Udagawa | E02F 9/2296 |
| 2020/0024825 | A1 * | 1/2020 | Futakami | E02F 3/96 |

FOREIGN PATENT DOCUMENTS

| | | | |
|---|---|---|---|
| CN | 110359511 | | 10/2019 |
| EP | 3279482 | A1 | 2/2018 |
| EP | 3556945 | A1 | 10/2019 |
| EP | 3575502 | A1 | 12/2019 |
| GB | 2431436 | A | 4/2007 |
| GB | 2441258 | A | 2/2008 |
| JP | H0823768 | B2 | 3/1996 |
| JP | H0979212 | A | 3/1997 |
| JP | 2017020604 | A | 1/2017 |
| JP | 2017053383 | A | 3/2017 |
| JP | 2018132178 | A | 8/2018 |
| JP | 2019173273 | A | 10/2019 |
| WO | 2016157531 | A1 | 10/2016 |

OTHER PUBLICATIONS

International Search Report related to Application No. PCT/EP2021/025003; reported on Mar. 31, 2021.

* cited by examiner

| Standard mode | | Mode A | | Mode B | | Mode C | |
|---|---|---|---|---|---|---|---|
| First | Second | First | Second | First | Second | First | Second |
| First flow rate control valve 30 for boom | Second flow rate control valve 33 for boom | First flow rate control valve 30 for boom | Second flow rate control valve 33 for boom | Second flow rate control valve 33 for boom | First flow rate control valve 30 for boom | Second flow rate control valve 33 for boom | First flow rate control valve 30 for boom |
| Second flow rate control valve 35 for stick | First flow rate control valve 31 for stick | First flow rate control valve 31 for stick | Second flow rate control valve 35 for stick | Second flow rate control valve 35 for stick | First flow rate control valve 31 for stick | First flow rate control valve 31 for stick | Second flow rate control valve 35 for stick |

FIG. 4

HYDRAULIC CONTROL SYSTEM FOR A WORKING MACHINE

CROSS-REFERENCE TO RELATED APPLICATION

This application is a USC § 371 US National Stage filing International Application No. PCT/EP2021/025003 filed on Jan. 8, 2021 which claims priority under the Paris Convention to Japanese Patent Application 2020-03371 filed on Jan. 14, 2020.

TECHNICAL FIELD

The present invention relates to a technical field of hydraulic control system used in working machines such as a hydraulic excavator.

BACKGROUND ART

In general, some hydraulic systems to be installed in working machines such as the hydraulic excavator comprise first and second hydraulic pumps and multiple hydraulic actuators to which a hydraulic pressure is supplied from the first and second hydraulic pumps, and some of these multiple hydraulic actuators include large flow rate hydraulic actuator to which the hydraulic pressure is supplied from both first and second hydraulic pumps. Furthermore, when supplying pressure oil to the large flow rate hydraulic actuator, a configuration is known formerly where either one of first and second hydraulic pumps supplies pressure oil preferentially as a main pump and the other hydraulic pump supplies only the shortage of the main pump (for example, refer to Patent Literature 1). In this type of hydraulic system, when operating two or more hydraulic actuators (in a cooperative manner) including the large flow rate hydraulic actuator at the same time, an operability and a working efficiency are largely affected by which one of first and second hydraulic pumps of the large flow rate hydraulic actuator is configured to be the main pump. For example, when first hydraulic pump is set as main for the large flow rate hydraulic actuator and the other hydraulic actuator operated at the same time uses the second pump as a hydraulic supply source, while the pressure oil for the large flow rate hydraulic actuator is supplied only by the main pump, both hydraulic actuators can be operated as a standalone from each other, but when first hydraulic pump is set as main for the large flow rate hydraulic actuator and the other hydraulic actuator operated at the same time also sets the first hydraulic pump as hydraulic supply source, and the operability and working efficiency are degraded since a delivery flow rate of first hydraulic pump is always divided into the large flow rate hydraulic actuator and the other hydraulic actuator.

So, according to the Patent Literature 1 mentioned above, the supply flow rates of first and second hydraulic pumps for the hydraulic actuator are configured to be controlled by assigning a special priority to pressure oil supply order of first and second hydraulic pumps based on a combination of hydraulic actuators operated at the same time.

Also, a technology is known which can adjust the priority degree of the supply flow rate from first and second hydraulic pumps to each hydraulic actuator by installing an auxiliary valve at a upstream side of a direction switching valve for controlling the supply flow rate from first and second hydraulic pumps to each hydraulic actuator and narrowing down or shutting off the auxiliary valve according to the operation of the other hydraulic actuator (for example, refers to Patent Literature 2).

PRIOR ART LITERATURES

Patent Literatures

[PATENT LITERATURE 1] Japanese Examined Patent Publication No, 8-23768

[PATENT LITERATURE 2] Japanese Unexamined Patent Application Publication No. 9-79212

SUMMARY OF THE INVENTION

Problems to be Solved by the Invention

However, as for both conventional technologies mentioned above, the priority of the pressure oil supply from first and second hydraulic pumps to each hydraulic actuator has been set in advance depending on the combination of hydraulic actuators operated at the same time. The priority is deemed to be set highly efficiently by supposing a case of performing common task, but it may not be most suitable for all tasks, and further, even if the combinations of hydraulic actuators operated at the same time are the same, the preset priority may not be advantageous depending on a working speed desired by an operator for each hydraulic actuator; this is a problem and this is a challenge to be solved by this invention.

Means for Solving the Problems

This invention has been created in order to solve this challenge in consideration of current condition mentioned above; claim 1 of this invention is a hydraulic control system of working machines, comprising: first and second hydraulic pumps, multiple hydraulic actuators using either one of the first and second hydraulic pumps as a hydraulic supply source, multiple flow rate control valves controlling supply flow rates respectively from the first and second hydraulic pumps to respective hydraulic actuators, and a control means electronically controlling these flow rate control valves; wherein, the multiple hydraulic actuators include hydraulic actuator A which uses both first and second hydraulic pumps as hydraulic supply source, the flow rate control valves for the hydraulic actuator A are composed of a first flow rate control valve for hydraulic actuator A controlling a supply flow rate from first hydraulic pump to the hydraulic actuator A and a second flow rate control valve for hydraulic actuator A controlling a supply flow rate from the second hydraulic pump to the hydraulic actuator A; when a manipulator for hydraulic actuator A is operated, the control means controls the supply flow rate to the hydraulic actuator A by supplying pressure oil from one of first and second hydraulic pumps to the hydraulic actuator A at first and operating the first and second flow rate control valves for hydraulic actuators A sequentially in order to supply pressure oil from the one and the other of hydraulic pumps to hydraulic actuator A in proportion to increase of operation amount of the manipulator for hydraulic actuator A; and an operation means is installed in the hydraulic control system which can arbitrarily change working order of first and second flow rate control valves for hydraulic actuators A in order to arbitrarily change the hydraulic pump which supplies pressure oil to the hydraulic actuator A at first when the manipulator for hydraulic actuators A is operated.

The invention of claim 2 is the hydraulic control system of claim 1, wherein the hydraulic control system comprises a hydraulic actuator A direction switching valve which is allocated at a downstream side of the first and second flow rate control valves for hydraulic actuators A, switches a feed/discharge direction of hydraulic oil for hydraulic actuator A, and controls a discharge flow rate from hydraulic actuator A; the hydraulic actuator A direction switching valve, when either one of the first and second flow rate control valve is working for hydraulic actuators A, runs the supply flow rate controlled by the one flow rate control valve as-is to the hydraulic actuator A, and when both of the first and second flow rate control valves are working for hydraulic actuators A, runs the combined supply flow rate controlled by both of the flow rate control valves to the hydraulic actuator A.

The invention of claim 3 is the hydraulic control system of claim 1 or 2, wherein the operation means comprises a mode setting means for setting multiple modes which vary the working order of first and second flow rate control valves for hydraulic actuators A and a mode selection means for arbitrarily selecting either one of modes set up by the mode setting means.

The invention of claim 4 is the hydraulic control system of any of claims 1 to 3, wherein the hydraulic control system is equipped with an information acquisition means for acquiring fuel cost information in each case where the working order of first and second low rate control valves is varied for hydraulic actuators A and an information provision means which provides the fuel cost information acquired by the information acquisition means as determination information for changing the working order of first and second flow rate control valves for hydraulic actuators A.

The invention of claim 5 is the hydraulic control system of claim 4, wherein the information acquisition means is equipped with a determination means for determining the recommended working order of first and second flow rate control valves for hydraulic actuators A based on the fuel cost information acquired by the information acquisition means.

The invention is the hydraulic control system of any of claims 1 to 5, wherein the hydraulic control system is the hydraulic control system for controlling oil feed and discharge for each hydraulic actuator of a boom cylinder, stick cylinder, bucket cylinder, and swiveling motor installed in a hydraulic excavator; the bucket cylinder uses either one of first and second hydraulic pumps as a hydraulic supply source, the swiveling motor uses the other of first and second hydraulic pumps as the hydraulic supply source, and the boom cylinder and stick cylinder are hydraulic actuator A using both first and second hydraulic pumps as the hydraulic supply source; the flow rate control valve for the boom cylinder is composed of the first flow rate control valve for boom for controlling the supply flow rate from first hydraulic pump to the boom cylinder and the second flow rate control valve for boom for controlling the supply flow rate from second hydraulic pump to the boom cylinder, and the flow rate control valve for the stick cylinder is composed of the first flow rate control valve for stick for controlling the supply flow rate from first hydraulic pump to the stick cylinder and the second flow rate control valve for stick for controlling the supply flow rate from second hydraulic pump to the stick cylinder; and the operation means can arbitrarily change the working order of first and second flow rate control valves for boom when a boom manipulator is operated and the working order of first and second flow rate control valves for stick when a stick manipulator is operated.

Favorable Effects of the Invention

According to the invention of claim 1, the operator can arbitrarily change the hydraulic pump which supplies the pressure oil first to the hydraulic actuator A depending on details of each task and the operator's desired priority order even if the combination of hydraulic actuators to operate is the same during cooperative operation, enabling to contribute to enhance cooperative operability, working efficiency, and fuel cost.

According to the invention of claim 2, the operator can change the working order of first and second flow rate control valves for hydraulic actuators A regardless of discharge flow rate control from hydraulic actuator A, enabling to contribute to simplifying the system.

According to the invention of claim 3, even if there are multiple hydraulic actuators A and they use both first and second hydraulic pumps as hydraulic supply source, the operator can change the working order of first and second flow rate control valves for the multiple hydraulic actuators A by simply selecting a mode with the mode selection means.

According to the invention of claim 4, the operator can acquire the information about fuel cost as the determination information for determining the working order of first and second flow rate control valves for hydraulic actuators A, enabling to contribute to attaining fuel cost reduction.

According to the invention of claim 5, recommended working order of first and second flow rate control valves for hydraulic actuators A is provided as information to the operator.

According to the invention, the enhancement of cooperative operability of hydraulic excavator's various tasks, working efficiency, and fuel cost can be achieved.

BRIEF DESCRIPTION OF THE DRAWINGS

FIG. 4 is a drawing illustrating working order of first and second flow rate control valves for boom and stick in each mode.

DETAILED DESCRIPTION OF THE INVENTION

Figure 1:
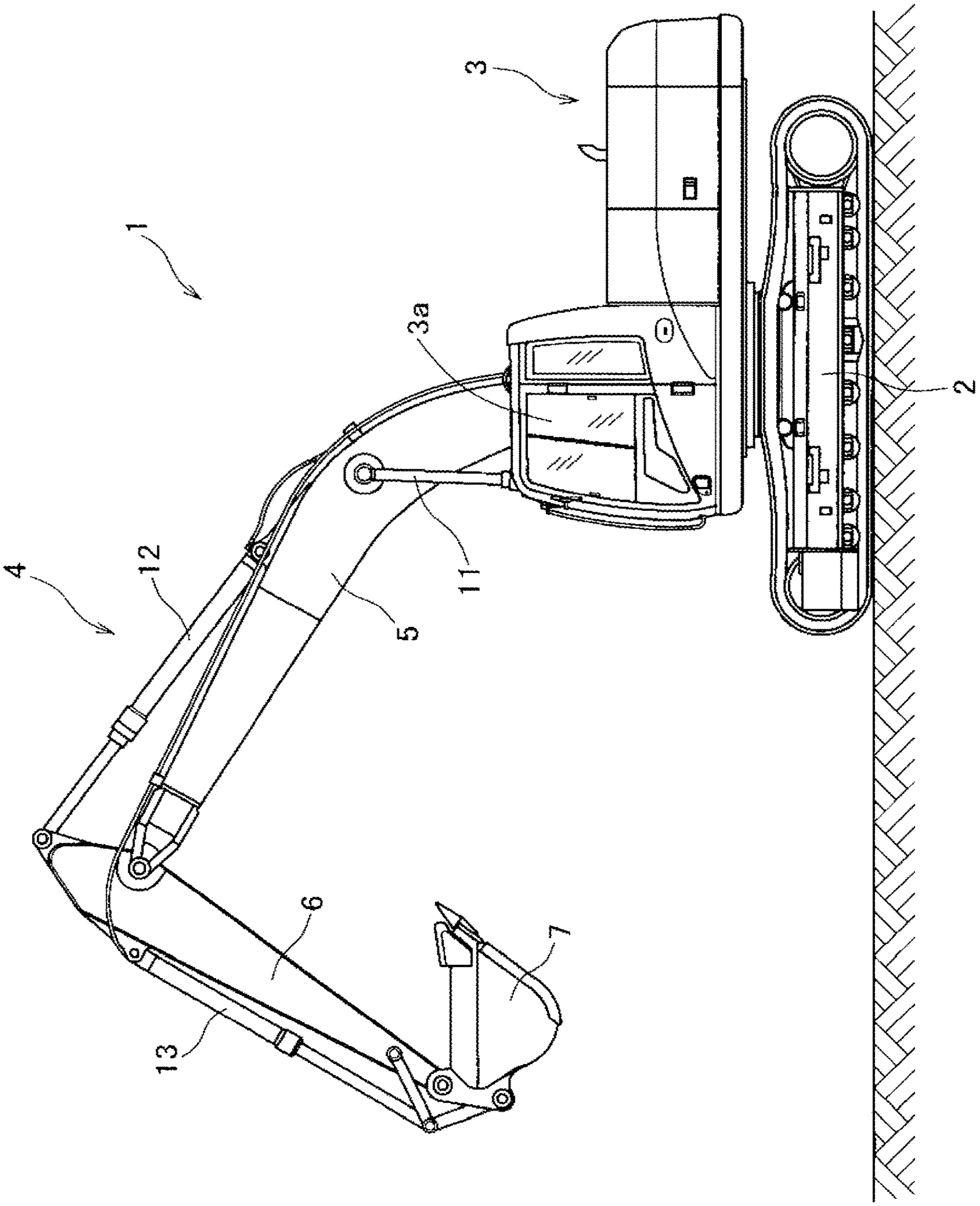
FIG. 1 is a side view of a hydraulic excavator.

Now, an explanation is provided below about an embodiment of the present invention based on drawings. In the FIG. 1, the number 1 indicates a hydraulic excavator of a working machine (equipped with a hydraulic control system according to the present invention) as an example, wherein the hydraulic excavator 1 includes a crawler type lower traveling body 2, an upper swiveling body 3 swivelably supported above the lower traveling body 2, and a front working part 4 mounted on the upper swiveling body 3; and furthermore, the front working part 4 includes a boom 5 whose base end part is supported vertically rockably by the upper swiveling body 3, a stick 6 longitudinally rockably supported on a tip end of the boom 5, a bucket 7 rockably fitted on a tip end of the stick 6, and others; wherein the hydraulic excavator 1 has left and right traveling motors 8, 9 (shown in FIG. 2) for moving the lower traveling body 2, a swiveling motor 10 (shown in FIG. 2) for swiveling the upper swiveling body 3, and various hydraulic actuators including boom cylinder 11, stick cylinder 12, bucket cylinder 13, and others for rocking the boom 5, stick 6, and bucket 7 respectively. Note that the number 3*a* in the FIG. 1 indicates an operator cab installed on the upper swiveling body 3.

Figure 2:
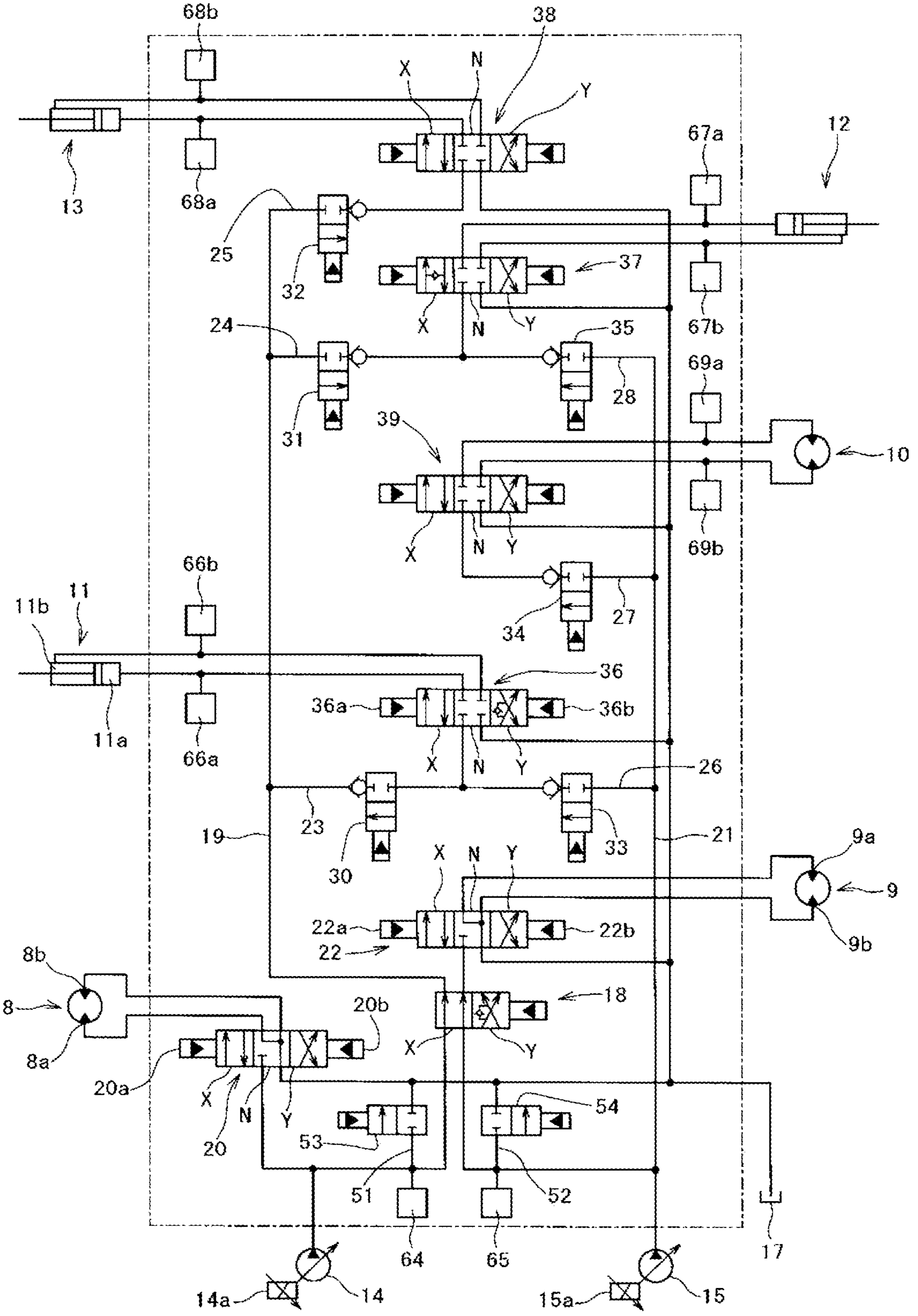
FIG. 2 is a hydraulic control circuit diagram of the hydraulic excavator.

Then, an explanation is provided about the hydraulic control circuit installed in the hydraulic excavator 1 based on the FIG. 2. In the FIG. 2, the numbers 14, 15 indicate first and second variable capacity type hydraulic pumps; the numbers 14*a*, 15*a* indicate capacity-varying means for making a capacity of first and second hydraulic pumps 14, 15 variable, based on a control signal from a controller 16 mentioned below; the number 17 indicates an oil tank; and the numbers 8 to 13 indicate left and right traveling motors, swiveling motor, boom cylinder, stick cylinder, and bucket cylinder mentioned above.

Note that, in the present embodiment, the boom cylinder 11 and stick cylinder 12 are hydraulic actuator and use both first and second hydraulic pumps 14, 15 as hydraulic supply source. Also, the swiveling motor 10, bucket cylinder 13 are hydraulic actuator and use either one of first and second hydraulic pumps 14, 15 as a hydraulic supply source (in this embodiment, the swiveling motor 10 uses second hydraulic pump 15 as the hydraulic supply source and the bucket cylinder 13 uses first hydraulic pump 14 as the hydraulic supply source). These boom cylinder 11, stick cylinder 12, swiveling motor 10, and bucket cylinder 13 are equivalent to hydraulic actuator of this invention, and further, the boom cylinder 11 and stick cylinder 12 are equivalent to hydraulic actuator A of this invention. Also, in the present embodiment, the left and right traveling motors 8, 9 are not equivalent to the hydraulic actuator of this invention.

The first hydraulic pump 14 is connected to first pump line 19 via straight travel valve 18 at first position X mentioned below as well as left travel control valve 20. Meanwhile, the second hydraulic pump 15 is connected to second pump line 21 as well as right travel control valve 22 via straight travel valve 18 at first position X.

The straight travel valve 18 is a two-way switching valve switching first and second positions X, Y based on the control signal output from the controller 16 mentioned below; wherein, in a condition that the straight travel valve 18 is positioned at first position X, delivery oil of first hydraulic pump 14 is supplied to first pump line 19 and left travel control valve 20 and the delivery oil of the second hydraulic pump 15 is supplied to the second pump line 21 and right travel control valve 22; and in the condition that straight travel valve 18 is positioned at the second position Y, the delivery oil of first hydraulic pump 14 is supplied to both left and right travel control valves 20, 22 and the delivery oil of the second hydraulic pump 15 is supplied to both first and second pump lines 19, 21. When left and right travel manipulators (not shown) only are operated, or when only the other manipulator for hydraulic actuator (manipulator for swiveling, boom, stick, and bucket, all not shown) other than travel manipulator is operated, the controller 16 controls to position the straight travel valve 18 fat first position X. Meanwhile, when both left and right travel manipulators are operated and the manipulator for other hydraulic actuator is also operated at the same time, the control signal is output to move the straight travel valve 18 to the second position Y. Thus, when left and right travel manipulators only are operated, the delivery oil from first and second hydraulic pumps 14, 15 are to be supplied through the straight travel valve 18 positioned at first position X via the left and right travel control valves 20, 22 to left and right traveling motors 8, 9, respectively, so that the flow can be supplied evenly to both traveling motors 8, 9; on the other hand, when both left and right travel manipulator as well as the manipulator for other hydraulic actuator are operated at the same time, the delivery flow rate from first hydraulic pump 14 is distributed into left and right traveling motors 8, 9 only, so that the flow rate can be supplied evenly to both traveling motors 8, 9. Next an explanation is provided about the case where straight travel valve 18 is positioned at first position X, that is, the delivery oil from first hydraulic pump 14 is supplied to first pump line 19 and left travel control valve 20 and the delivery oil from second hydraulic pump 15 is supplied to the second pump line 21 and right travel control valve 22.

The left and right travel control valves 20, 22 are pilot operated spool valve switching a feed/discharge direction as well as controlling a feed/discharge flow rate for left and right traveling motors 8, 9; and the left and right travel control valves 20, 22 comprise forward side/backward side pilot ports 20*a*, 20*b*, 22*a*, and 22*b* connected to proportional solenoid valves for traveling (left travel forward side/left travel backward side/right travel forward side/right travel backward side proportional solenoid valves, all not shown) for outputting pilot pressure based on the control signal output from the controller 16. So, the left and right travel control valves 20, 22 are positioned at neutral position N where the feed/discharge control is not performed for the left and right traveling motors 8, 9 while the pilot pressure is not input to the forward side/backward side pilot ports 20*a*, 20*b*, 22*a*, and 22*b*; but when the pilot pressure is input into the forward side pilot ports 20*a*, 22*a*, the left and right travel control valves 20, 22 are configured to be positioned at forward operating position X where the delivery oil from first and second hydraulic pumps 14, 15 is supplied to either port 8*a* or port 9*a* of the left and right traveling motors 8, 9 to drive forward the left and right traveling motors 8, 9, and the delivery oil from the other ports 8*b*, 9*b* is discharged into the oil tank 17; when the pilot pressure is input into the backward side pilot ports 20*b*, 22*b*, the left and right travel control valves 20, 22 are configured to be positioned at backward operating position Y where the delivery oil from first and second hydraulic pumps 14, 15 is supplied to the other ports 8*b*, 9*b* of the left and right traveling motors 8, 9 in order to drive backward the left and right traveling motors 8, 9, and the delivery oil from either port 8*a* or port 9*a* is discharged into the oil tank 17; when the left and right travel control valves 20, 22 are positioned at forward or backward operating position X or Y, the supply and discharge flow rates for the left and right traveling motors 8, 9 are to be controlled to increase or decrease as an opening area of supply and discharge valve passages increases or decreases in proportion to spool's moving amount coupled with the increase or decrease of the pilot pressure output from the proportional solenoid valves for traveling to the forward side or backward side pilot ports 20a, 20b, 22a, and 22b. Also, when the left and right travel manipulators are operated, the controller 16 is to control the proportional solenoid valves for traveling to output the pilot pressure which increases or decreases in proportion to operation amount of the left and right travel manipulators, thus enabling to drive left and right traveling motors 8, 9 at a rate corresponding to the operation amount of the left and right travel manipulators.

Note that, in this embodiment, the left and right travel control valves 20, 22 are not equivalent to the flow rate control valve and direction switching valve of this invention. By the way, the operability of left and right traveling motors 8, 9 alone or when driven in a cooperative manner with other hydraulic actuator is to be ensured with the straight travel valve 18 mentioned above.

On one side, supply oil passages 23, 24, and 25 for boom, stick, and bucket are branched in parallel to each other from first pump line 19 connected to the first hydraulic pump 14; also, supply oil passages 26, 27, and 28 for boom, swiveling, and stick are branched in parallel to each other from second pump line 21 connected to the second hydraulic pump 15. Also, respective flow rate control valves 30 to 35 for first boom, first stick, bucket, second boom, swiveling, and second stick are disposed to respective supply oil passages 23 to 28 for first boom, first stick, bucket, second boom, swiveling, and second stick.

Note that the respective flow rate control valves 30 to 35 for first boom, first stick, bucket, second boom, swiveling, and second stick are equivalent to the flow rate control valve of this invention. Furthermore, first flow rate control valves 30, 31 for boom and stick are equivalent to first flow rate control valve for hydraulic actuator A of this invention, and second flow rate control valves 33, 35 for boom and stick are equivalent to second flow rate control valve for hydraulic actuator A of this invention.

Figure 3:
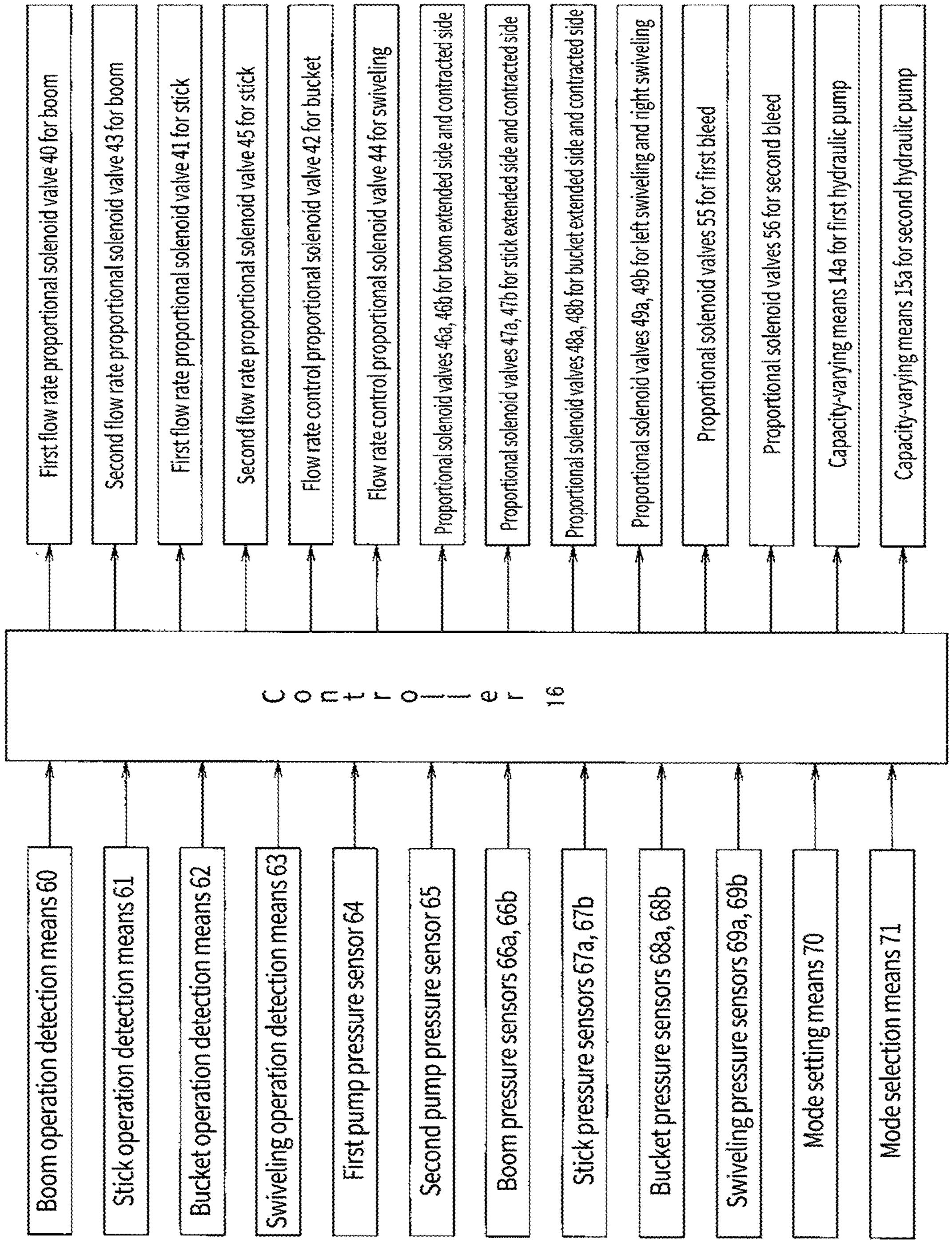
FIG. 3 is a block diagram illustrating input/output of controller.

The respective flow rate control valves 30 to 35 for first boom, first stick, bucket, second boom, swiveling, and second stick are poppet valve which is pilot operated to control flow by respective flow rate control solenoid valves (flow rate control proportional solenoid valves 40, 41, 42, 43, 44, and 45 for first boom, first stick, bucket, second boom, swiveling, and second stick, each is shown in FIG. 3) working based on the control signal output from the controller 16; wherein, the first flow rate control valve 30 for boom controls the supply flow rate from first hydraulic pump 14 to the boom cylinder 11 to run to boom direction switching valve 36 mentioned below. Also, the first flow rate control valve 31 for stick controls the supply flow rate from first hydraulic pump 14 to the stick cylinder 12 to run to stick direction switching valve 37. Also, the flow rate control valve 32 for bucket controls the supply flow rate from first hydraulic pump 14 to the bucket cylinder 13 to run to bucket direction switching valve 38. Also, the second flow rate control valve 33 for boom controls the supply flow rate from the second hydraulic pump 15 to the boom cylinder 11 to run to boom direction switching valve 36. Also, the flow rate control valve 34 for swiveling controls the supply flow rate from the second hydraulic pump 15 to the swiveling motor 10 to run to swiveling direction switching valve 39. Also, the second flow rate control valve 35 for stick controls the supply flow rate from the second hydraulic pump 15 to the stick cylinder 12 to run to stick direction switching valve 37. Furthermore, respective flow rate control valves 30 to 35 have a backflow prevention function, the oil flow from first and second hydraulic pumps 14, 15 to respective corresponding direction switching valves 36 to 39 is permitted, but a backflow is prevented.

The boom direction switching valve 36 is allocated at downstream side of the first and second flow rate control valves 30, 33 for boom, and the flow from the first or second flow rate control valve 30 or 33 for boom, or the flows from the first and second flow rate control valves 30 and 33 for boom are supplied together. Also, the stick direction switching valve 37 is allocated at downstream side of the first and second flow rate control valves 31, 35 for stick, and the flow from the first or second flow rate control valve 31 or 35 for stick, or the flows from the first and second flow rate control valves 31 and 35 for stick are supplied together. Also, the bucket direction switching valve 38 is allocated at downstream side of the flow rate control valve 32 for bucket, and the flow rate is supplied from the flow rate control valve 32 for bucket. Also, the swiveling direction switching valve 39 is allocated at downstream side of the flow rate control valve 34 for swiveling, and the flow rate is supplied from the flow rate control valve 34 for swiveling.

So, as mentioned below, the respective boom, stick, bucket, and swiveling direction switching valves 36 to 39 are configured to not control but run the supply flow rate from the respective flow rate control valves 30, 33, 31, 35, 32, and 34 for first and second boom, first and second stick, bucket, and swiveling as-is to the boom cylinder 11, stick cylinder 12, bucket cylinder 13, and swiveling motor 10.

Next, explanations are provided in detail about the boom, stick, bucket, and swiveling direction switching valves 36 to 39; these boom, stick, bucket, and swiveling direction switching valves 36 to 39 are closed center type spool valve which is pilot operated by respective proportional solenoid valves (proportional solenoid valves 46a, 46b for boom extended side and contracted side, proportional solenoid valves 47a, 47b for stick extended side and contracted side, proportional solenoid valves 48a, 48b for bucket extended side and contracted side, and proportional solenoid valves 49a, 49b for left swiveling and right swiveling, each is shown in FIG. 3) outputting the pilot pressure based on the control signal output from the controller 16, and as mentioned below, are configured to switch feed/discharge direction of hydraulic oil for corresponding hydraulic actuator (boom cylinder 11, stick cylinder 12, bucket cylinder 13, and swiveling motor 10), and control the discharge flow rate from the hydraulic actuator, but not control the supply flow rate to the hydraulic actuator.

First of all, an explanation is provided about the boom direction switching valve 36; the boom direction switching valve 36 comprises extended and contracted side pilot ports 36a, 36b connected to proportional solenoid valves 46a, 46b for boom extended side and contracted side outputting the pilot pressure based on the control signal output from the controller 16. So, when the pilot pressure is not input into both extended and contracted side pilot ports 36a, 36b, the boom direction switching valve 36 is positioned at neutral position N where oil is neither fed to nor discharged from the boom cylinder 11; when the pilot pressure is input into extended side pilot port 36a, the boom direction switching valve 36 is switched to extended operating position X to supply the supply flow rate from first and second flow rate control valves 30, 33 for boom to head side oil chamber 11a and discharge the discharge oil from rod side oil chamber 11b to oil tank 17. Also, when the pilot pressure is input into contracted side pilot port 36b, the boom direction switching valve 36 is configured to be switched to contracted operating position Y to supply the supply flow rate from first and second flow rate control valves 30, 33 for boom to rod side oil chamber 11b, discharge the oil from head side oil chamber 11a to oil tank 17, and supply a portion of discharge oil from head side oil chamber 11*a* to rod side oil chamber 11*b* as regenerated oil. So, as for an opening area of the boom direction switching valve 36 at extended and contracted side operating positions X, Y, the opening area of supply valve passages supplying the flow rate from first and second flow rate control valves 30, 33 for boom to head side and rod side oil chambers 11*a*, 11*b* of the boom cylinder 11 is configured to be sufficiently larger than that of first and second flow rate control valves 30, 33 for boom, and the supply flow rate controlled by first and second flow rate control valves 30, 33 for boom is supplied as-is to the head side and rod side oil chambers 11*a*, 11*b*. Meanwhile, the opening area of discharge valve passage discharging the oil from the head side and rod side oil chambers 11*a*, 11*b* in boom cylinder 11 is controlled to increase or decrease by the pilot pressure input into extended and contracted side pilot ports 36*a*, 36*b*, that is, the control signal output from the controller 16 to proportional solenoid valves 46*a*, 46*b* for boom extended side and contracted side; and the discharge flow rate from the head side and rod side oil chambers 11*a*, 11*b* is controlled to increase or decrease by the opening area of supply valve passage of boom direction switching valve 36. Thus, the boom direction switching valve 36 is configured to switch the feed/discharge direction of hydraulic oil for boom cylinder 11, control the discharge flow rate from the boom cylinder 11, not control the supply flow rate to the boom cylinder 11, and supply the supply flow rate controlled by first and second flow rate control valves 30, 33 for boom as-is to the boom cylinder 11.

Also, a simple explanation is provided about the stick, bucket, and swiveling direction switching valves 37, 38, and 39 since they are similar to the boom direction switching valve 36; the stick, bucket, and swiveling direction switching valves 37, 38, and 39 are pilot operated respectively by proportional solenoid valves 47*a*, 47*b* for stick extended side and contracted side, proportional solenoid valves 48*a*, 48*b* for bucket extended side and contracted side, and proportional solenoid valves 49*a*, 49*b* for left swiveling and right swiveling to switch from neutral position N to operating position X or Y; as for the opening area of operating positions X, Y, the opening area of supply valve passages supplying the supply flow rate from the flow rate control valves 31, 35, 32, and 34 for first and second stick, bucket, and swiveling to stick cylinder 12, bucket cylinder 13, and swiveling motor 10 are to be configured to be sufficiently larger than that of respective flow rate control valves 31, 35, 32, and 34, and the supply flow rate controlled by the respective flow rate control valves 31, 35, 32, and 34 is supplied as-is to the stick cylinder 12, bucket cylinder 13, and swiveling motor 10. Also, the opening area of discharge valve passages discharging the discharge oil from the stick cylinder 12, bucket cylinder 13, and swiveling motor 10 to oil tank 17 is to be controlled to increase or decrease based on the control signal output from the controller 16 to respective corresponding proportional solenoid valves 47*a*, 47*b*, 48*a*, 48*b*, 49*a*, and 49*b*, the discharge flow rate from the stick cylinder 12, bucket cylinder 13, and swiveling motor 10 is to be controlled to increase or decrease by controlling to increase or decrease the opening area of these discharge valve passages. Thus, the stick, bucket, and swiveling direction switching valves 37, 38, and 39 are configured to switch feed/discharge direction of hydraulic oil for stick cylinder 12, bucket cylinder 13, and swiveling motor 10 respectively, control the discharge flow rate from the stick cylinder 12, bucket cylinder 13, and swiveling motor 10, not control the supply flow rate to the stick cylinder 12, bucket cylinder 13, and swiveling motor 10, and supply the supply flow rate controlled by the respective flow rate control valves 31, 35, 32, and 34 for first and second stick, bucket, and swiveling as-is to the stick cylinder 12, bucket cylinder 13, and swiveling motor 10.

Furthermore, numbers 51, 52 in FIG. 2 are first and second bleed lines branched from first and second pump lines 19, 21 each to the oil tank 17, and first and second bleed valves 53, 54 are disposed to these first and second bleed lines 51, 52, respectively. These first and second bleed valves 53, 54 are to be operated by the pilot pressure output from proportional solenoid valves 55, 56 (shown in FIG. 3) for first and second bleeds to control the increase or decrease of the bleed flow rate running from first and second hydraulic pumps 14, 15 through first and second bleed lines 51, 52 to oil tank 17; and the proportional solenoid valves 55, 56 for first and second bleeds is to control the increase or decrease of pilot pressure output to first and second bleed valves 53, 54 based on the control signal output from the controller 16.

Meanwhile, as shown in the block diagram of FIG. 3, the controller 16 (equivalent to control means of this invention) is configured to receive the signal from a boom operation detection means 60 detecting operating direction and operation amount of a boom manipulator, a stick operation detection means 61 detecting operating direction and operation amount of a stick manipulator, a bucket operation detection means 62 detecting operating direction and operation amount of a bucket manipulator, a swiveling operation detection means 63 detecting operating direction and operation amount of a swiveling manipulator, first and second pump pressure sensors 64, 65 detecting a delivery pressure of first and second hydraulic pumps 14, 15, boom pressure sensors 66*a*, 66*b* detecting head side and rod side load pressure of the boom cylinder 11, respectively, stick pressure sensors 67*a*, 67*b* detecting head side and rod side load pressure of the stick cylinder 12, respectively, bucket pressure sensors 68*a*, 68*b* detecting head side and rod side load pressure of the bucket cylinder 13, respectively, swiveling pressure sensors 69*a*, 69*b* detecting left and right swiveling load pressure of the swiveling motor 10, respectively, mode setting means 70, mode selection means 71 both mentioned below, and others; and based on this input signal, the controller 16 is configured to output control signal to the flow rate control proportional solenoid valves 40, 43, 41, 45, 42, and 44 for first boom, second boom, first stick, second stick, bucket, and swiveling, proportional solenoid valves 46*a*, 46*b* for boom extended side and contracted side, proportional solenoid valves 47*a*, 47*b* for stick extended side and contracted side, proportional solenoid valves 48*a*, 48*b* for bucket extended side and contracted side, proportional solenoid valves 49*a*, 49*b* for left swiveling and right swiveling, proportional solenoid valves 55, 56 for first and second bleeds, capacity-varying means 14*a*, 15*a* for first and second hydraulic pumps 14, 15, and others to control the oil feed and discharge for boom cylinder 11, stick cylinder 12, bucket cylinder 13, and swiveling motor 10, bleed flow rate for first and second bleed lines 51, 52, the delivery flow rate for first and second hydraulic pumps 14, 15, and others. Note that the boom and stick manipulators are equivalent to manipulator for hydraulic actuator A of this invention. Also, the controller 16 controls switching of straight travel valve 18 mentioned above and oil feed and discharge for left and right motors 8, 9, but an explanation about these controls is omitted here.

Here, as mentioned below, as for the pressure oil supply from both first and second hydraulic pumps 14, 15 as hydraulic supply source to the boom cylinder 11, when the boom manipulator is operated, either one of first and second flow rate control valves 30, 33 for boom is configured to operate at first to supply pressure oil from either one of first and second hydraulic pumps 14, 15 to the boom cylinder 11, and as the operation amount of the boom manipulator increases, the other of first and second flow rate control valves 30, 33 for boom is configured to operate to supply pressure oil also from the other of first and second hydraulic pumps 14, 15 so that the pressure oil is supplied from the one and the other of first and second hydraulic pumps 14, 15. Similarly, as for the pressure oil supply from both first and second hydraulic pumps 14, 15 as pressure oil source to the stick cylinder 12, when the stick manipulator is operated, either one of first and second flow rate control valves 31, 35 for stick is configured to operate at first, and as the operation amount of the stick manipulator increases, the other of first and second flow rate control valves 31, 35 for stick is configured to operate. So, the working order of the first and second flow rate control valves 30, 33 for boom and first and second flow rate control valves 31, 35 for stick is configured to be changed arbitrarily with the mode setting means 70 and mode selection means 71.

The mode setting means 70 and mode selection means 71 are, for example, an operation means (dial, switch, touch panel, keyboard, etc.) installed in an operation panel (not shown), monitoring device (not shown) in the operator cab 3*a*, PC (not shown) connected to controller 16, and others; the mode setting means 70 can arbitrarily set those multiple modes which have different working order of the first and second flow rate control valves 30, 33 for boom and first and second low rate control valves 31, 35 for stick, and the mode selection means 71 enables to choose one of these multiple modes arbitrarily set up by the mode setting means 70.

In the present embodiment, the mode setting means 70 sets four modes: "Standard Mode", "Mode A", "Mode B", and "Mode C"; among first and second flow rate control valves 30, 33, 31, and 35 for boom and stick, the valve running first is set to "First" and the valve running later is set to "Second" as the operation amount increases, as shown in FIG. 4, in the "Standard Mode", the flow rate control valves 30, 35 for first boom and second stick are set to "First" and the flow rate control valves 33, 31 for second boom and first stick are set to "Second"; in the "Mode A", the flow rate control valves 30, 31 for first boom and first stick are set to "First" and the flow rate control valves 33, 35 for second boom and second stick are set to "Second"; in the "Mode B", the flow rate control valves 33, 35 for second boom and second stick are set to "First" and the flow rate control valves 30, 31 for first boom and first stick are set to "Second"; in the "Mode C", the flow rate control valves 33, 31 for second boom and first stick are set to "First" and the flow rate control valves 30, 35 for first boom and second stick are set to "Second". The mode selection means 71 is able to arbitrarily select either mode of these four modes: "Standard Mode", "Mode A", "Mode B", and "Mode C". Note that the mode setting means 70 and mode selection means 71 constitute the operation means of this invention.

Next, an explanation is provided about the control performed by the controller 16.

When a detection signal is input from respective operation detection means 60 to 63 for boom, stick, bucket, and swiveling, the controller 16 calculates the target supply and discharge flow rates for the boom cylinder 11, stick cylinder 12, bucket cylinder 13, and swiveling motor 10 depending on the operating direction and operation amount of each manipulator. So, the controller 16 outputs an control command to respective proportional solenoid valves 46*a*, 46*b* to 49*a*, 49*b* (proportional solenoid valves 46*a*, 46*b* for boom extended side and contracted side, proportional solenoid valves 47*a*, 47*b* for stick extended side and contracted side, proportional solenoid valves 48*a*, 48*b* for bucket extended side and contracted side, and proportional solenoid valves 49*a*, 49*b* for left swiveling and right swiveling) to output the pilot pressure to respective boom, stick, bucket, and swiveling direction switching valves 36 to 39 so that the oil feed/discharge direction for the boom cylinder 11, stick cylinder 12, bucket cylinder 13, and swiveling motor 10 corresponds to an operating direction of the manipulator and the discharge flow rate from the boom cylinder 11, stick cylinder 12, bucket cylinder 13, and swiveling motor 10 is the target discharge flow rate.

Furthermore, the controller 16 output the control signal to respective proportional solenoid valves 40 to 45 (flow rate control proportional solenoid valves 40, 43, 41, 45, 42, and 44 for first boom, second boom, first stick, second stick, bucket, and swiveling) to output the pilot pressure to the respective flow rate control valves 30, 33, 31, 35, 32, and 34 for first and second boom, first and second stick, bucket, and swiveling so that the target supply flow rate is supplied to the boom cylinder 11, stick cylinder 12, bucket cylinder 13, and swiveling motor 10. In this case, as for the bucket cylinder 13 and swiveling motor 10 which use either first or second hydraulic pump 14 or 15 as a hydraulic supply source, the target supply flow rate is controlled so that the flow rate control valves 32, 34 for bucket and swiveling can supply the target supply flow rate.

Meanwhile, as for the boom cylinder 11 and stick cylinder 12 which use both first and second hydraulic pumps 14, 15 as a hydraulic supply source, the controller 16 determines which mode is selected from "Standard Mode", "Mode A", "Mode B", and "Mode C" mentioned above based on the signal from the mode selection means 71. So, the first and second flow rate control valves 30, 33, 31, 35 for boom and stick in a preset order of each mode ("First" and "Second", mentioned above) are operated to control the target supply flow rate supplied from the first and second flow rate control valves 30, 33, 31, 35 for boom and stick to the boom cylinder 11 and stick cylinder 12. In this case, the controller 16 controls the supply flow rate so that the supply flow rate from either first or second flow rate control valves (set as "First") for boom and stick is the target supply flow rate; when the target supply flow rate is not enough only from the supply flow rate from the either first or second flow rate control valves for boom and stick above as the operation amount of the boom and stick manipulators increases, the controller 16 operates the other flow rate control valves (set as "Second") for boom and stick as well; and total flow rate from the either first or second flow rate control valves for boom and stick and the other flow rate control valves for boom and stick is controlled to be the target flow rate.

Moreover, when the detection signal is input from the respective operation detection means 60 to 63 for boom, stick, bucket, and swiveling, the controller 16 calculates a target delivery flow rate according to the increase of operation amount of manipulator based on the detection signal to increase the discharge flow rate of first and second hydraulic pumps 14, 15, and outputs the control signal to capacity-varying means 14*a*, 15*a* for first and second hydraulic pumps 14, 15 so that the target delivery flow rate can be obtained. Here, the delivery flow rate for first and second hydraulic pumps 14, 15 is controlled individually according to first and second hydraulic pumps 14, 15 as a hydraulic supply source for operated boom cylinder 11, stick cylinder 12, bucket cylinder 13, or swiveling motor 10.

Moreover, when the detection signal is input from the respective operation detection means 60 to 63 for boom, stick, bucket, and swiveling, the controller 16 controls first and second bleed valves 53, 54 by outputting the control signal to the proportional solenoid valves 55, 56 for first and second bleeds according to the increase of operation amount of manipulator based on the detection signal in order to decrease the bleed flow rate (including decreasing bleed flow rate to zero) running from first and second hydraulic pumps 14, 15 to oil tank 17. Here, the bleed flow rate for first and second bleed lines 51, 52 is controlled individually according to first and second hydraulic pumps 14, 15 as a hydraulic supply source for operated boom cylinder 11, stick cylinder 12, bucket cylinder 13, or swiveling motor 10.

Next, according to FIGS. 5 to 8, detailed explanations are provided about the operation of flow rate control valves 30 to 35 in respective modes: "Standard Mode", "Mode A", "Mode B", and "Mode C". These figures illustrate a relationship between the operation amount of boom, stick, bucket, and swiveling manipulators and controlled flow rates for flow rate control valves 30, 33, 31, 35, 32, and 34 for first and second boom, first and second stick, bucket, and swiveling, a solid line indicates controlled flow rate of first hydraulic pump 14 as pressure oil source, and a dotted line indicates controlled flow rate of second hydraulic pump 15 as hydraulic supply source.

Figure 5:
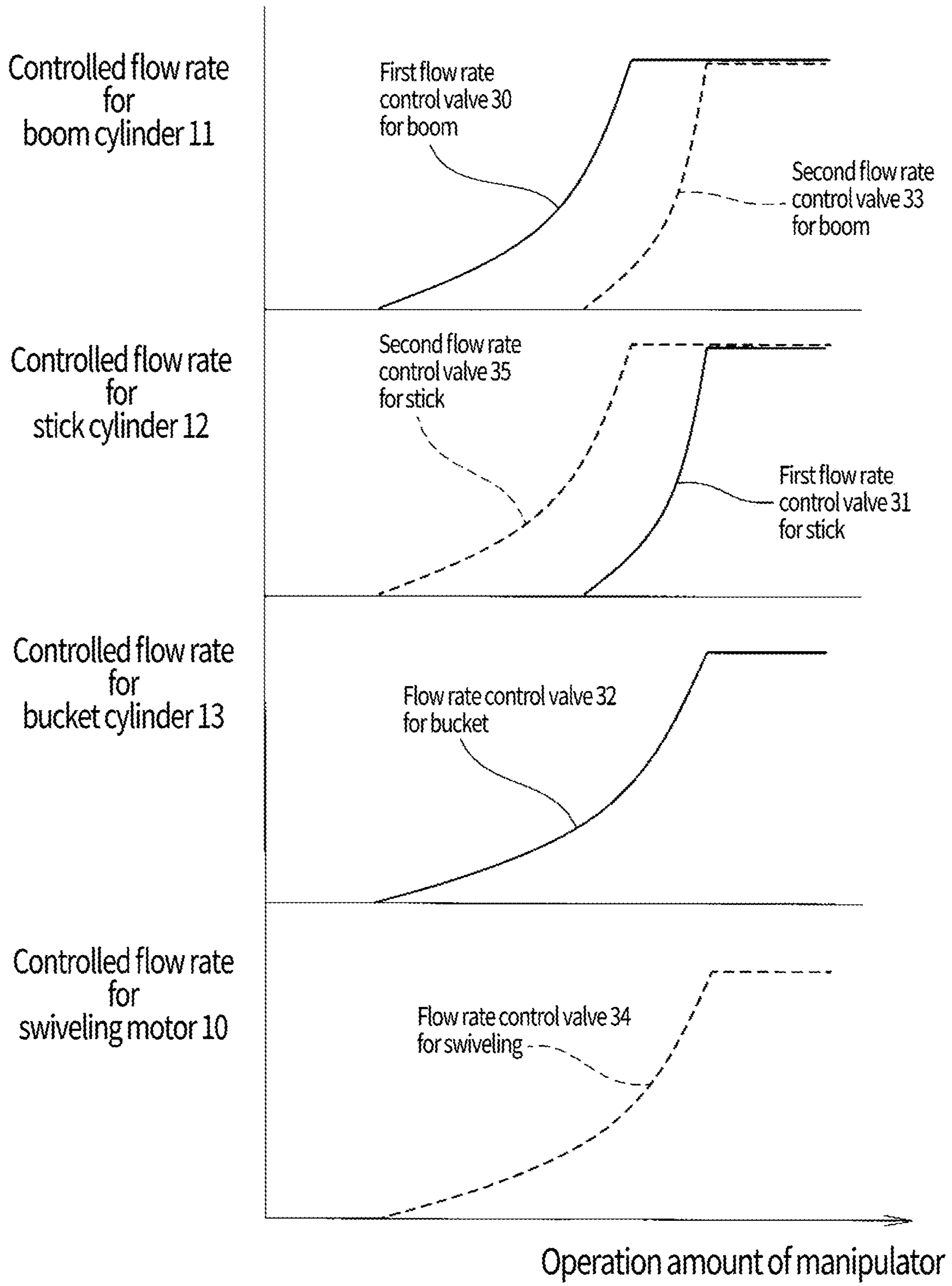
FIG. 5 is a drawing illustrating a relationship between operation amount of manipulator for each hydraulic actuator and controlled flow rate control valve in "Standard Mode".

First of all, in "Standard Mode" shown in FIG. 5, when the boom manipulator is operated, first flow rate control valve 30 for boom operates at first, so that delivery oil controlled by the first flow rate control valve 30 for boom is supplied from first hydraulic pump 14 to the boom cylinder 11. As the operation amount of the boom manipulator increases, second flow rate control valve 33 for boom also operates, so that, in addition to pressure oil supplied from the first hydraulic pump 14, delivery oil controlled by the second flow rate control valve 33 for boom is also supplied from second hydraulic pump 15 to the boom cylinder 11.

Additionally, in "Standard Mode", when the stick manipulator is operated, second flow rate control valve 35 for stick operates at first, so that delivery oil controlled by the second flow rate control valve 35 for stick is supplied from second hydraulic pump 15 to the stick cylinder 12. As the operation amount of the stick manipulator increases, first flow rate control valve 31 for stick also operates, so that, in addition to pressure oil supplied from the second hydraulic pump 15, delivery oil controlled by the first flow rate control valve 31 for stick is also supplied from first hydraulic pump 14 to the stick cylinder 12.

Additionally, in "Standard Mode", when the bucket manipulator is operated, flow rate control valve 32 for bucket operates, so that delivery oil controlled by the flow rate control valve 32 for bucket is supplied from first hydraulic pump 14 to the bucket cylinder 13.

Additionally, in "Standard Mode", when the swiveling manipulator is operated, flow rate control valve 34 for swiveling operates, so that delivery oil controlled by the flow rate control valve 34 for swiveling is supplied from second hydraulic pump 15 to the swiveling motor 10.

Thus, in this "Standard Mode", as for hydraulic actuators, i.e., the boom cylinder 11 and stick cylinder 12 which use both first and second hydraulic pumps 14, 15 as a hydraulic supply source, the pressure oil from first hydraulic pump 14 is supplied to the boom cylinder 11 at first and the pressure oil from second hydraulic pump 15 is supplied to the stick cylinder 12 at first, so hydraulic supply source to supply pressure oil at first is different between them. Also, as for hydraulic actuators, i.e., the bucket cylinder 13 and swiveling motor 10 which use either first or second hydraulic pumps 14, 15 as a hydraulic supply source, the pressure oil from first hydraulic pump 14 is supplied to the bucket cylinder 13 and the pressure oil from second hydraulic pump 15 is supplied to the swiveling motor 10, so hydraulic supply source is different between them. Thus, when hydraulic excavator 1 carries out common tasks such as digging and loading on dumper truck, the delivery oil is distributed in a well balanced manner from first and second hydraulic pumps 14, 15 to each hydraulic actuator (e.g. the boom cylinder 11, stick cylinder 12, bucket cylinder 13, and swiveling motor 10) being operated in a cooperative manner, achieve excellence in versatility.

Figure 6:
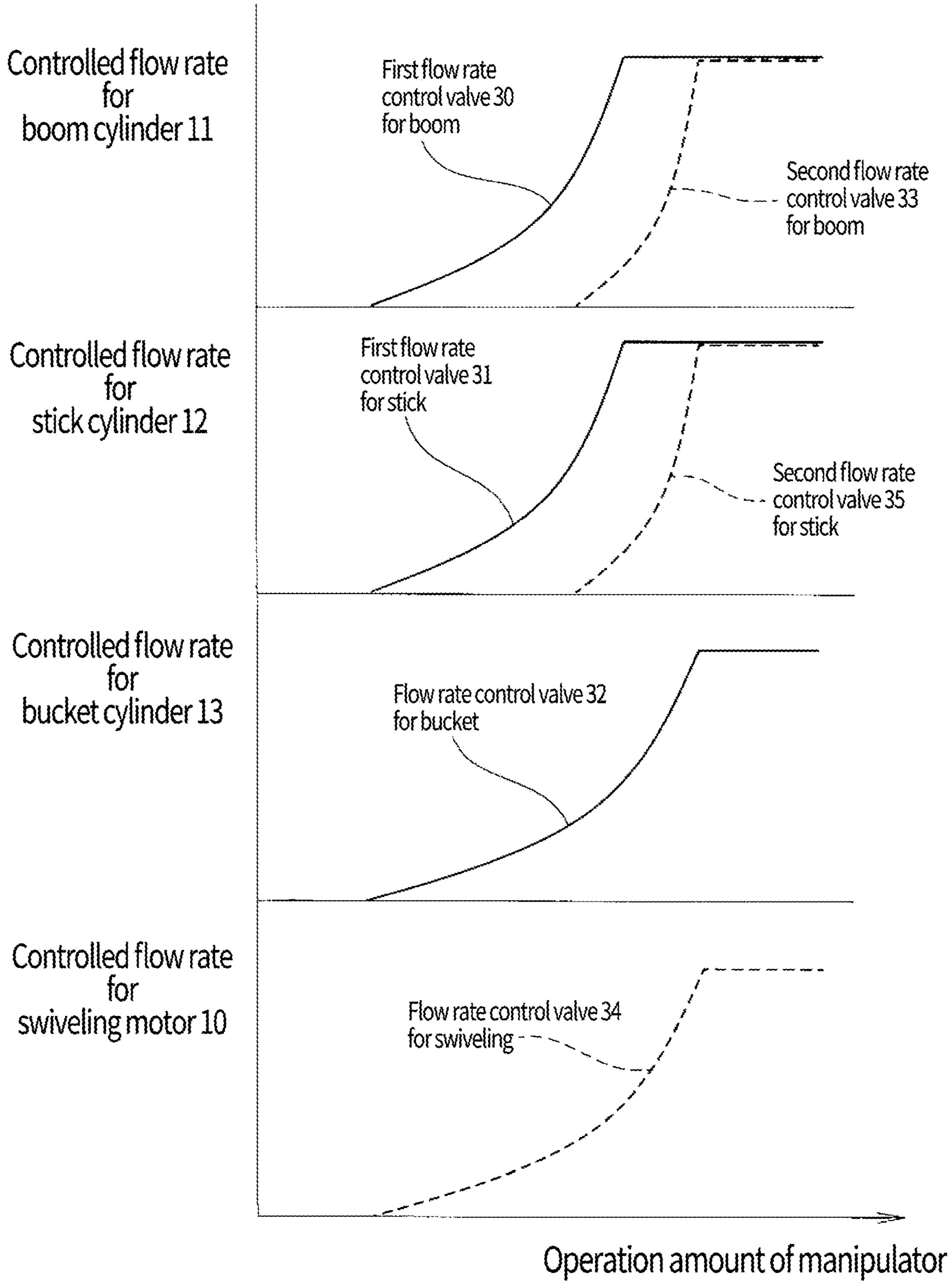
FIG. 6 is a drawing illustrating a relationship between operation amount of manipulator for each hydraulic actuator and controlled flow rate control valve in "Mode A".

Meanwhile, in "Mode A" shown in FIG. 6, when the boom manipulator is operated, the first flow rate control valve 30 for boom operates at first, so that delivery oil controlled by the first flow rate control valve 30 for boom is supplied from first hydraulic pump 14 to the boom cylinder 11. As the operation amount of the boom manipulator increases, second flow rate control valve 33 for boom also operates, so that, in addition to pressure oil supplied from the first hydraulic pump 14, delivery oil controlled by the second flow rate control valve 33 for boom is also supplied from second hydraulic pump 15 to the boom cylinder 11.

Additionally, in "Mode A", when the stick manipulator is operated, first flow rate control valve 31 for stick operates at first, so that delivery oil controlled by the first flow rate control valve 31 for stick is supplied from first hydraulic pump 14 to the stick cylinder 12. As the operation amount of the stick manipulator increases, second flow rate control valve 35 for stick also operates, so that, in addition to pressure oil supplied from the first hydraulic pump 14, delivery oil controlled by the second flow rate control valve 35 for stick is also supplied from second hydraulic pump 15 to the stick cylinder 12.

Additionally, in "Mode A", when the bucket and swiveling manipulators are operated, similar to "Standard Mode" mentioned above, the delivery oil is supplied from first hydraulic pump 14 to the bucket cylinder 13 and the delivery oil is supplied from second hydraulic pump 15 to the swiveling motor 10.

Thus, in this "Mode A", as for the boom cylinder 11 and stick cylinder 12 which use both first and second hydraulic pumps 14, 15 as a hydraulic supply source, the pressure oil is supplied from first hydraulic pump 14 at first to both of them. Meanwhile, as for the bucket cylinder 13 and swiveling motor 10 which use either first or second hydraulic pumps 14, 15 as a hydraulic supply source, the pressure oil from first hydraulic pump 14 is supplied to the bucket cylinder 13 and the pressure oil from second hydraulic pump 15 is supplied to the swiveling motor 10. Thus, when the operation amount of the boom cylinder 11 and stick cylinder 12 is small (when moving them slowly), while the delivery oil from first hydraulic pump 14 is distributed among the boom cylinder 11, stick cylinder 12, and bucket cylinder 13, the delivery oil from second hydraulic pump 15 is exclusively supplied to the swiveling motor 10. Therefore, in contrast to "Standard Mode" mentioned above, an area increases where the swiveling motor 10 can be operated without sharing pressure oil source with other hydraulic actuators, and cooperative operability and working efficiency can be enhanced in cases of a task giving preference to swiveling, a task combining the swiveling with a slow operation of boom 5, stick 6, and bucket 7, or a task combining the swiveling with one of boom 5, stick 6, and bucket 7, and others.

Figure 7:
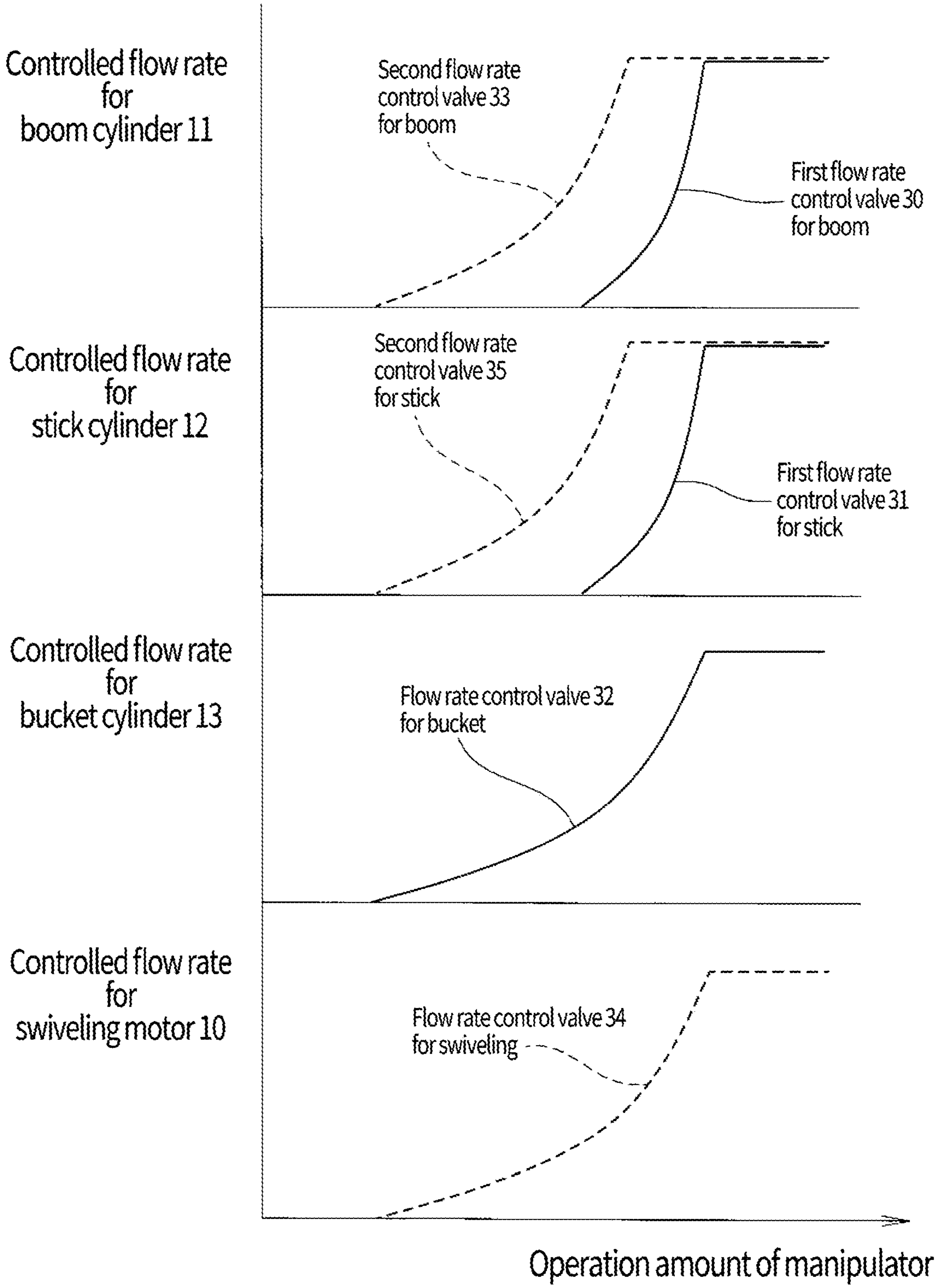
FIG. 7 is a drawing illustrating a relationship between operation amount of manipulator for each hydraulic actuator and controlled flow rate control valve in "Mode B".

Also, in "Mode B" shown in FIG. 7, when the boom manipulator is operated, the second flow rate control valve 33 for boom operates at first, so that delivery oil controlled by the second flow rate control valve 33 for boom is supplied from second hydraulic pump 15 to the boom cylinder 11. As the operation amount of the boom manipulator increases, first flow rate control valve 30 for boom also operates, so that, in addition to pressure oil supplied from the second hydraulic pump 15, delivery oil controlled by the first flow rate control valve 30 for boom is also supplied from first hydraulic pump 14 to the boom cylinder 11.

Additionally, in "Mode B", when the stick manipulator is operated, second flow rate control valve 35 for stick operates at first, so that delivery oil controlled by the second flow rate control valve 35 for stick is supplied from second hydraulic pump 15 to the stick cylinder 12. As the operation amount of the stick manipulator increases, first flow rate control valve 31 for stick also operates, so that, in addition to pressure oil supplied from the second hydraulic pump 15, delivery oil controlled by the first flow rate control valve 31 for stick is also supplied from first hydraulic pump 14 to the stick cylinder 12.

Additionally, in "Mode B", when the bucket and swiveling manipulators are operated, similar to "Standard Mode" and "Mode A" mentioned above, the delivery oil is supplied from first hydraulic pump 14 to the bucket cylinder 13 and the delivery oil is supplied from second hydraulic pump 15 to the swiveling motor 10.

Thus, in this "Mode B", as for the boom cylinder 11 and stick cylinder 12 which use both first and second hydraulic pumps 14, 15 as a hydraulic supply source, the pressure oil is supplied from second hydraulic pump 15 at first to both of them. Meanwhile, as for the bucket cylinder 13 and swiveling motor 10 which use either first or second hydraulic pumps 14, 15 as a hydraulic supply source, the pressure oil from first hydraulic pump 14 is supplied to the bucket cylinder 13 and the pressure oil from second hydraulic pump 15 is supplied to the swiveling motor 10. Thus, when the operation amount of the boom cylinder 11 and stick cylinder 12 is small, while the delivery oil from second hydraulic pump 15 is distributed among the boom cylinder 11, stick cylinder 12, and swiveling motor 10, the delivery oil from first hydraulic pump 14 is exclusively supplied to the bucket cylinder 13. Therefore, in contrast to "Standard Mode" mentioned above, an area increases where the bucket cylinder 13 can be operated without sharing pressure oil source with other hydraulic actuators, and cooperative operability and working efficiency can be enhanced in cases of a task giving preference to bucket 7, a task combining the bucket 7 with one of boom 5, stick 6, and swiveling (a task combining in/out operation of the bucket 7 with an ascent of boom 5, for example), and others.

Figure 8:
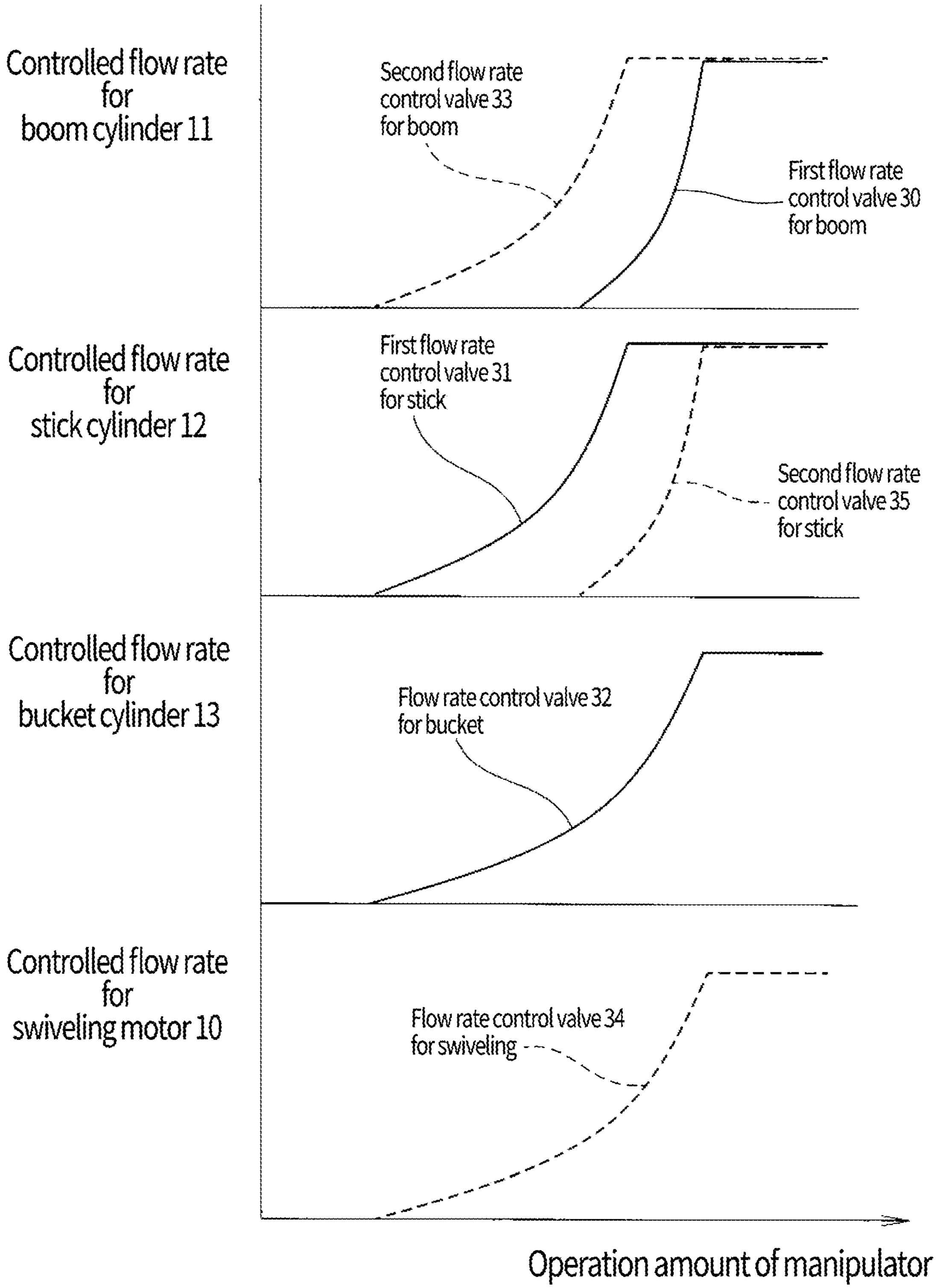
FIG. 8 is a drawing illustrating a relationship between operation amount of manipulator for each hydraulic actuator and controlled flow rate control valve in "Mode C".

Furthermore, in "Mode C" shown in FIG. 8, when the boom manipulator is operated, the second flow rate control valve 33 for boom operates at first, so that delivery oil controlled by the second flow rate control valve 33 for boom is supplied from second hydraulic pump 15 to the boom cylinder 11. As the operation amount of the boom manipulator increases, first flow rate control valve 30 for boom also operates, so that, in addition to pressure oil supplied from the second hydraulic pump 15, delivery oil controlled by the first flow rate control valve 30 for boom is also supplied from first hydraulic pump 14 to the boom cylinder 11.

Additionally, in "Mode C", when the stick manipulator is operated, first flow rate control valve 31 for stick operates at first, so that delivery oil controlled by the first flow rate control valve 31 for stick is supplied from first hydraulic pump 14 to the stick cylinder 12. As the operation amount of the stick manipulator increases, second flow rate control valve 35 for stick also operates, so that, in addition to pressure oil supplied from the first hydraulic pump 14, delivery oil controlled by the second flow rate control valve 35 for stick is also supplied from second hydraulic pump 15 to the stick cylinder 12.

Additionally, in "Mode C", when the bucket and swiveling manipulators are operated, similar to "Standard Mode", "Mode A", and "Mode B" mentioned above, the delivery oil is supplied from first hydraulic pump 14 to the bucket cylinder 13 and the delivery oil is supplied from second hydraulic pump 15 to the swiveling motor 10.

Thus, in "Mode C", as for the boom cylinder 11 and stick cylinder 12 which use both first and second hydraulic pumps 14, 15 as a hydraulic supply source, the pressure oil from second hydraulic pump 15 is supplied to the boom cylinder 11 at first, and the pressure oil from first hydraulic pump 14 is supplied to the stick cylinder 12 at first. Meanwhile, as for the bucket cylinder 13 and swiveling motor 10 which use either first or second hydraulic pumps 14, 15 as a hydraulic supply source, the pressure oil from first hydraulic pump 14 is supplied to the bucket cylinder 13 and the pressure oil from second hydraulic pump 15 is supplied to the swiveling motor 10. Thus, as the stick cylinder 12 and swiveling motor 10 have different hydraulic supply source at first from each other, a cooperative operability and working efficiency between stick 6 and swiveling and can be enhanced; and, as the boom cylinder 11 and stick cylinder 12 have different hydraulic supply source at first from each other, the cooperative operability between boom 5 and stick 6 can ensure same operability as "Standard Mode".

In the embodiment configured as described above, the hydraulic control system of hydraulic excavator 1 is configured to comprise first and second hydraulic pumps 14, 15, multiple hydraulic actuators 11 to 13 and 10 (boom cylinder 11, stick cylinder 12, bucket cylinder 13, and swiveling motor 10) which have either one of the first and second hydraulic pumps 14, 15 as hydraulic supply source, multiple flow rate control valves 30 to 35 (first and second flow rate control valves 30, 33 for boom, first and second flow rate control valves 31, 35 for stick, flow rate control valve 32 for bucket, and flow rate control valve 34 for swiveling) controlling respective supply flow rates from the first and second hydraulic pumps 14, 15 to respective hydraulic actuators 11 to 13 and 10, controller 16 electronically controlling these flow rate control valves 30 to 35, and others; wherein the boom cylinder 11 and stick cylinder 12 of the multiple hydraulic actuators use both first and second hydraulic pumps 14, 15 as a hydraulic supply source; and the flow rate control valve for the boom cylinder 11 is composed of the first flow rate control valve 30 for boom controlling the supply flow rate from first hydraulic pump 14 to the boom cylinder 11 and the second flow rate control valve 33 for boom controlling the supply flow rate from the second hydraulic pump 15 to the boom cylinder 11; also, the flow rate control valve for stick cylinder 12 is composed of the first flow rate control valve 31 for stick controlling the supply flow rate from first hydraulic pump 14 to the stick cylinder 12 and the second flow rate control valve 35 for stick controlling the supply flow rate from the second hydraulic pump 15 to the stick cylinder 12. So, when the boom manipulator is operated, the controller 16 is configured to supply pressure oil at first from either one of first and second hydraulic pumps 14, 15 to the boom cylinder 11, and as the operation amount of the boom manipulator increases, the controller 16 is configured to operate the first and second flow rate control valves 30, 33 for boom sequentially in order to control the supply flow rate for the boom cylinder 11 so that pressure oil is supplied from the one and the other of hydraulic pumps to the boom cylinder 11, and similarly, when the stick manipulator is operated, the controller 16 is configured to supply pressure oil at first from either one of first and second hydraulic pumps 14, 15 to the stick cylinder 12, and as the operation amount of the stick manipulator increases, the controller 16 is configured to operate the first and second stick flow rate control valves 31, 35 for sequentially in order to control the supply flow rate for the stick cylinder 12 so that supply pressure oil is supplied from the one and the other of hydraulic pumps to the stick cylinder 12; in these cases, the hydraulic control system is equipped with an operation means (mode setting means 70 and mode selection means 71) which can arbitrarily change working order of the first and second flow rate control valves 30, 33 for boom and first and second flow rate control valves 31, 35 for stick, so when the operation means changes the working order of the first and second flow rate control valves 30, 33 for boom and first and second flow rate control valves 31, 35 for stick and when the boom or stick manipulator is operated, the hydraulic pump 14 or 15 can be changed arbitrarily which supplies pressure oil at first to the boom or stick cylinder 11 or 12.

As a result, when operating multiple hydraulic actuators simultaneously in a cooperative manner including the boom cylinder 11 and stick cylinder 12 to which pressure oil is supplied from both first and second hydraulic pumps 14, 15, an operator can arbitrarily select hydraulic pump 14 or 15 which supplies the pressure oil at first to the boom cylinder 11 and stick cylinder 12 depending on details of each task and the operator's desired priority order even if the combination of operating hydraulic actuators is the same, enabling to contribute to enhance cooperative operability, working efficiency, and fuel cost. In addition, since the choice of hydraulic pump 14 or 15 which supplies pressure oil to the boom cylinder 11 and stick cylinder 12 at first is configured to be performed by changing the working order of first flow rate control valves 30, 31 for boom and stick controlling the supply flow rate from first hydraulic pump 14 to boom cylinder 11 and stick cylinder 12 and second flow rate control valves 33, 35 for boom and stick controlling the supply flow rate from second hydraulic pump 15 to boom cylinder 11 and stick cylinder 12, there is no need to change a circuit of hydraulic control system or add some member separately, enabling to contribute to suppressing cost.

Furthermore, the hydraulic control system comprises the boom direction switching valve 36 and the stick direction switching valves 37 which are allocated at downstream side of the first and second flow rate control valves 30, 33 for boom and first and second flow rate control valves 31, 35 for stick, switch the feed/discharge direction of hydraulic oil to the boom cylinder 11 and stick cylinder 12, and control the discharge flow rate from the boom cylinder 11 and stick cylinder 12; when either one of first and second flow rate control valves 30, 33 for boom and first and second flow rate control valves 31, 35 for stick is operated, the boom and stick direction switching valve 36, 37 run the supply flow rate controlled by the one of flow rate control valves 30, 33 for boom and flow rate control valves 31, 35 for stick as-is to the boom cylinder 11 and stick cylinder 12; when both first and second flow rate control valves 30, 33 for boom and first and second flow rate control valves 31, 35 for stick are operated, the boom and stick direction switching valves 36, 37 run combined supply flow rate controlled by both of the flow rate control valves 30, 33 for boom and flow rate control valves 31, 35 for stick to the boom cylinder 11 and stick cylinder 12.

Thus, the supply flow rate to boom cylinder 11 and stick cylinder 12 is controlled by the first flow rate control valves 30, 31 for boom and stick controlling the supply flow rate from first hydraulic pump 14, and second flow rate control valves 33, 35 for boom and stick controlling the supply flow rate from second hydraulic pump 15; on the other hand, the discharge flow from the boom cylinder 11 and stick cylinder 12 is controlled by the boom and stick direction switching valves 36, 37, so the supply and discharge flow rates of the boom cylinder 11 and stick cylinder 12 can be controlled separately with individual valves, so that the relationship between the supply and discharge flow rates can be easily changed according to details of task, etc., the working order of the first and second flow rate control valves 30, 33 for boom and first and second flow rate control valves 31, 35 for stick can be changed regardless of discharge flow rate control from the boom cylinder 11 and stick cylinder 12, there is no need to take care of lest the change of working order give an impact on the discharge flow rate control, and the system can avoid complexity.

Furthermore, in this system, the operation means to arbitrarily change the working order of the first and second flow rate control valves 30, 33 for boom and first and second flow rate control valves 31, 35 for stick is composed of mode setting means 70 for setting multiple modes which vary the working order of the first and second flow rate control valves 30, 33 for boom and first and second flow rate control valves 31, 35 for stick and mode selection means 71 for arbitrarily selecting either one of modes set up by the mode setting means 70. Thus, by setting the mode preliminarily with the mode setting means 70, even if there are multiple hydraulic actuators which use both first and second hydraulic pumps 14, 15 as hydraulic supply source, the operator can change the working order of these multiple flow rate control valves for first and second hydraulic actuators by simply selecting the mode with the mode selection means 71.

Moreover, in the present embodiment, this invention is implemented in the controlling oil feed and discharge for each hydraulic actuator of boom cylinder 11, stick cylinder 12, bucket cylinder 13, and swiveling motor 10 installed in hydraulic excavator 1; the bucket cylinder 13 uses either one of first and second hydraulic pumps 14, 15 as a hydraulic supply source, the swiveling motor 10 uses the other of first and second hydraulic pumps 14, 15 as the hydraulic supply source, and the boom cylinder 11 and stick cylinder 12 are hydraulic actuator using both first and second hydraulic pumps 14, 15 as the hydraulic supply source; the flow rate control valve for the boom cylinder 11 is composed of the first flow rate control valve 30 for boom for controlling the supply flow rate from first hydraulic pump 14 to the boom cylinder 11 and the second flow rate control valve 33 for boom for controlling the supply flow rate from second hydraulic pump 15 to the boom cylinder 11, the flow rate control valve for the stick cylinder 12 is composed of the first flow rate control valve 31 for stick for controlling the supply flow rate from first hydraulic pump 14 to the stick cylinder 12 and the second flow rate control valve 35 for stick for controlling the supply flow rate from second hydraulic pump 15 to the stick cylinder 12; and the operation means (mode setting means 70 and mode selection means 71) can arbitrarily change the working order of first and second flow rate control valves 30, 33 for boom when the boom manipulator is operated and the working order of first and second flow rate control valves 31, 35 for stick when the stick manipulator is operated. So, the cooperative operability of various tasks in hydraulic excavator 1, working efficiency, and fuel cost can be enhanced by implementing this invention to the boom cylinder 11, stick cylinder 12, bucket cylinder 13, and swiveling motor 10 installed in this way in hydraulic excavator 1.

Note that the embodiment is obviously not confined to this embodiment mentioned above; for example, the hydraulic control system can be equipped with an information acquisition means for acquiring fuel cost information in each case where the working order of first and second flow rate control valves is varied for hydraulic actuators A, and an information provision means which provides the fuel cost information acquired by the information acquisition means to the operator as determination information for changing the working order of first and second flow rate control valves for hydraulic actuators A. In this case, the fuel cost information may be average power and average fuel cost as for example, and the average power can be obtained by calculating instantaneous output values based on pump pressure data and variable capacity data (detected value of pump pressure sensor detecting delivery pressure of first and second hydraulic pumps, control command value output to capacity-varying means of first and second hydraulic pumps, etc.) of first and second hydraulic pumps which the controller (control means) holds while controlling flow rate control valves and direction switching valves and by dividing integrated instantaneous output values by time; and the average fuel cost can be obtained by calculating instantaneous fuel cost values based on fuel injection data input from an engine controller and dividing integrated instantaneous fuel cost values by time. So, the information acquisition means, in each case where the working order of first and second flow rate control valves is varied for hydraulic actuators A (each mode, when multiple modes are set which vary the working order of first and second flow rate control valves for hydraulic actuators A), is configured to calculate the fuel cost information (average power and/or average fuel cost) as mentioned above, on the other hand, the information provision means is configured to provide the fuel cost information acquired by the information acquisition means to the operator by displaying the information on a monitor, etc. as determination information (determination information for selecting the mode) when changing the working order of first and second flow rate control valves for hydraulic actuators A. Note that, as there is typically a correlation with the average fuel cost mentioned above, the information may be configured to be provided by calculating either one of average power and average fuel cost as the fuel cost information. Also, when the information acquisition means acquires the cost information, a dedicated mode for the information acquisition may be configured to set up to acquire the fuel cost information while a user is working on typical task in this mode, and the fuel cost information may also be configured to be acquired while the user is working on usual task without setting up this mode.

Moreover, the information acquisition means may be configured to have an automatic determination means which determines the recommended working order of first and second flow rate control valves for hydraulic actuators A based on the fuel cost information acquired by the information acquisition means. Here, the information about the recommended working order determined by the automatic determination means is provided to the operator through the information provision means.

So, in this way, the operator can acquire the information about fuel cost as the determination information for determining the working order of first and second flow rate control valves for hydraulic actuators A by setting up the information acquisition means which, in each case where the working order of first and second flow rate control valves is varied for hydraulic actuators A (each mode when multiple modes are set which vary the working order of first and second flow rate control valves for hydraulic actuators A), calculates the fuel cost information (average power and/or average fuel cost, for example) and the automatic determination means which determines the recommended working order of first and second flow rate control valves for hydraulic actuators A based on the information acquired by the information acquisition means, enabling to contribute apparently to attaining the fuel cost reduction.

INDUSTRIAL APPLICABILITY

This invention can be utilized in hydraulic control system of working machines equipped with hydraulic actuators where the pressure oil is supplied from both first and second hydraulic pumps.

The invention claimed is:

1. A hydraulic control system of working machines, comprising: first and second hydraulic pumps, multiple hydraulic actuators using either one of the first and second hydraulic pumps as a hydraulic supply source, multiple flow rate control valves controlling supply flow rates respectively from the first and second hydraulic pumps to respective hydraulic actuators, and a control means electronically controlling these flow rate control valves;

wherein, the multiple hydraulic actuators include hydraulic actuator A which uses both first and second hydraulic pumps as hydraulic supply source, the flow rate control valves for the hydraulic actuator A are composed of a first flow rate control valve for hydraulic actuator A controlling a supply flow rate from first hydraulic pump to the hydraulic actuator A and a second flow rate control valve for hydraulic actuator A controlling a supply flow rate from the second hydraulic pump to the hydraulic actuator A; when a manipulator for hydraulic actuator A is operated, the control means controls the supply flow rate to the hydraulic actuator A by supplying pressure oil from one of first and second hydraulic pumps to the hydraulic actuator A at first and operating the first and second flow rate control valves for hydraulic actuators A sequentially in order to supply pressure oil from the one and the other of hydraulic pumps to hydraulic actuator A in proportion to increase of operation amount of the manipulator for hydraulic actuator A; and an operation means is installed in the hydraulic control system which can arbitrarily change working order of first and second flow rate control valves for hydraulic actuators A in order to arbitrarily change the hydraulic pump which supplies pressure oil to the hydraulic actuator A at first when the manipulator for hydraulic actuators A is operated;

wherein the hydraulic control system comprises a hydraulic actuator A direction switching valve which is allocated at a downstream side of the first and second flow rate control valves for hydraulic actuators A, switches a feed/discharge direction of hydraulic oil for hydraulic actuator A and controls a discharge flow rate from hydraulic actuator A; the hydraulic actuator A direction switching valve, when either one of the first and second flow rate control valve is working for hydraulic actuator A, runs the supply flow rate controlled by the one flow rate control valve as-is to the hydraulic actuator A, and when both of the first and second flow rate control valves are working for hydraulic actuator A, runs the combined supply flow rate controlled by both of the flow rate control valves to the hydraulic actuator A.

2. The hydraulic control system of claim 1, wherein the operation means comprises a mode setting means for setting multiple modes which vary the working order of first and second flow rate control valves for hydraulic actuators A and a mode selection means for arbitrarily selecting either one of modes set up by the mode setting means.

3. The hydraulic control system of claim 1, wherein the hydraulic control system is equipped with an information acquisition means for acquiring fuel cost information in each case where the working order of first and second hydraulic flow rate control valves is varied for actuator A and an information provision means which provides the fuel cost information acquired by the information acquisition means as determination information for changing the working order of first and second flow rate control valves for hydraulic actuator A.

4. The hydraulic control system of claim 3, wherein the information acquisition means is equipped with a determination means for determining the recommended working order of first and second flow rate control valves for hydraulic actuator A based on the fuel cost information acquired by the information acquisition means.

5. The hydraulic control system of claim 1, wherein the hydraulic control system is the hydraulic control system for controlling oil feed and discharge for each hydraulic actuator of a boom cylinder, stick cylinder, bucket cylinder, and swiveling motor installed in a hydraulic excavator; the bucket cylinder uses either one of first and second hydraulic pumps as a hydraulic supply source, the swiveling motor uses the other of first and second hydraulic pumps as the hydraulic supply source, and the boom cylinder and stick cylinder are each hydraulic actuator A using both first and second hydraulic pumps as the hydraulic supply source; the flow rate control valve for the boom cylinder is composed of the first flow rate control valve for boom for controlling the supply flow rate from first hydraulic pump to the boom cylinder and the second flow rate control valve for boom for controlling the supply flow rate from second hydraulic pump to the boom cylinder, and the flow rate control valve for the stick cylinder is composed of the first flow rate control valve for stick for controlling the supply flow rate from first hydraulic pump to the stick cylinder and the second flow rate control valve for stick for controlling the supply flow rate from second hydraulic pump to the stick cylinder; and the operation means can arbitrarily change the working order of first and second flow rate control valves for boom when a boom manipulator is operated and the working order of first and second flow rate control valves for stick when a stick manipulator is operated.

* * * * *